US009484042B2

(12) United States Patent
Liu et al.

(10) Patent No.: US 9,484,042 B2
(45) Date of Patent: Nov. 1, 2016

(54) SPEECH ENHANCING METHOD, DEVICE FOR COMMUNICATION EARPHONE AND NOISE REDUCING COMMUNICATION EARPHONE

(75) Inventors: Song Liu, Weifang (CN); Bo Li, Weifang (CN); Jian Zhao, Weifang (CN)

(73) Assignee: GOERTEK INC. (CN)

( * ) Notice: Subject to any disclaimer, the term of this patent is extended or adjusted under 35 U.S.C. 154(b) by 239 days.

(21) Appl. No.: 14/110,879

(22) PCT Filed: Mar. 16, 2012

(86) PCT No.: PCT/CN2012/072483

§ 371 (c)(1),
(2), (4) Date: Dec. 25, 2013

(87) PCT Pub. No.: WO2013/020380

PCT Pub. Date: Feb. 14, 2013

(65) Prior Publication Data

US 2014/0172421 A1 Jun. 19, 2014

(30) Foreign Application Priority Data

Aug. 10, 2011 (CN) .......................... 2011 1 0229003

(51) Int. Cl.
*G10L 15/20* (2006.01)
*G10L 21/02* (2013.01)
(Continued)

(52) U.S. Cl.
CPC ......... *G10L 21/0208* (2013.01); *H04R 1/1083* (2013.01); *H04R 1/1041* (2013.01); *H04R 3/005* (2013.01); *H04R 2410/01* (2013.01); *H04R 2410/05* (2013.01)

(58) Field of Classification Search
CPC .. H04R 1/1083; H04R 3/005; G10K 11/178; G10L 21/0208
See application file for complete search history.

(56) References Cited

U.S. PATENT DOCUMENTS 5,125,032 A * 6/1992 Meister .................... A61F 11/14 381/151
5,825,897 A * 10/1998 Andrea ................ G10K 11/178 381/71.13

(Continued)

FOREIGN PATENT DOCUMENTS

CN 1643571 A 7/2005
CN 1967658 A 5/2007

(Continued)

OTHER PUBLICATIONS

International Search Report for PCT/CN2012/072483, mailed Jul. 5, 2012.

(Continued)

*Primary Examiner* — Jialong He
(74) *Attorney, Agent, or Firm* — Hauptman Ham, LLP

(57) ABSTRACT

The present invention provides a speech enhancing method for communication earphone including two parts: sending end noise reduction processing and receiving end noise reduction processing, wherein the sending end noise reduction processing part includes: determining a wearing condition of the earphone by comparing energy difference of sound signals picked up by microphones of the communication earphone; if the earphone is normally worn, subjecting the sound signal first to multi-microphone noise reduction and then to single channel noise reduction to further suppress residuary stationary noise; otherwise suppressing stationary noise in the sound signal by single channel noise reduction directly.

18 Claims, 4 Drawing Sheets

(51) Int. Cl.

| | |
|---|---|
| ***G10L 21/0208*** | (2013.01) |
| *H04R 1/10* | (2006.01) |
| *H04R 3/00* | (2006.01) |

(56) References Cited

U.S. PATENT DOCUMENTS

| | | | | | |
|---|---|---|---|---|---|
| 8,223,986 | B2 * | 7/2012 | Sander | H04R 1/1083 | 381/122 |
| 8,767,973 | B2 * | 7/2014 | Andrea | H04R 3/005 | 381/71.11 |
| 2003/0053650 | A1 * | 3/2003 | Wang | H04R 1/1041 | 381/384 |
| 2005/0276421 | A1 * | 12/2005 | Bergeron | G10K 11/178 | 381/71.6 |
| 2008/0076489 | A1 * | 3/2008 | Rosener | H04M 1/6066 | 455/575.2 |
| 2010/0020998 | A1 * | 1/2010 | Brown | H04R 1/1041 | 381/380 |
| 2011/0026732 | A1 * | 2/2011 | Buck | H04R 3/005 | 381/92 |
| 2011/0033064 | A1 * | 2/2011 | Johnson | H04R 1/1083 | 381/94.1 |
| 2011/0129097 | A1 * | 6/2011 | Andrea | H04R 3/005 | 381/71.6 |
| 2013/0024194 | A1 * | 1/2013 | Zhao | G10L 21/0208 | 704/228 |

FOREIGN PATENT DOCUMENTS

| | | | |
|---|---|---|---|
| CN | 101477800 | A | 7/2009 |
| CN | 101777349 | A | 7/2010 |
| CN | 101778333 | A | 7/2010 |
| CN | 101790752 | A | 7/2010 |
| CN | 101853667 | A | 10/2010 |
| CN | 102074236 | A | 5/2011 |
| CN | 102300140 | A | 12/2011 |
| EP | 1489885 | A2 | 12/2004 |
| EP | 1581026 | A1 | 9/2005 |
| JP | 2000330597 | | 11/2000 |
| JP | 2003241792 | A | 8/2003 |
| JP | 2003308092 | A | 10/2003 |
| JP | 2010130415 | A | 6/2010 |
| KR | 200447028 | Y1 | 12/2009 |
| KR | 20130054898 | A | 5/2013 |
| WO | 2008056649 | A1 | 5/2008 |

OTHER PUBLICATIONS

Chinese First Office Action No. 100004, mailed Jul. 1, 2013.

Korean Notice of Allowance for application No. 10-2013-7021521 dated Dec. 16, 2013.

Korean Office Action of KR 10-2013-7021521 dated Sep. 10, 2013.

Decision to grant a patent of Chinese Patent Application 201110229003.9 dated Oct. 10, 2013.

Decision to grant a patent of Japanese Patent Application 2013552095 dated Feb. 25, 2014.

* cited by examiner

SPEECH ENHANCING METHOD, DEVICE FOR COMMUNICATION EARPHONE AND NOISE REDUCING COMMUNICATION EARPHONE

CROSS REFERENCE TO RELATED APPLICATION

This application claims the priority of Chinese Patent Application No. 201110229003.9, filed on Aug. 10, 2011 in the Chinese Patent and Trade Mark Office. Further, this application is the National Phase application of International Application No. PCT/CN2012/072483, filed on Mar. 16, 2012 which is incorporated herein by reference in its entirety.

FIELD OF THE INVENTION

Present invention relates to the field of speech enhancement and noise reduction technology, more particularly, to a speech enhancing method and device for noise reduction at sending and receiving ends of a communication earphone by multiplexing sound signals picked up by a plurality of microphones, and a noise reducing communication earphone.

BACKGROUND

Development of informatization allows people to communicate at any moment and everywhere and widespread use of various communication equipments and technologies greatly facilitates life and enhances work efficiency. However, social development results in a severe issue, noise. In a noisy environment, definition and intelligibility of communication voice are severely compromised and when noise is high to a certain degree, communication can not proceed, and people's audition and physical and mental health will be injured.

In view of communication under very noisy background, existing art implements noise reduction through the following schemes: on the one hand, acoustics signal processing technology is applied at the sending end of communication earphone to enhance Signal-to-Noise Ratio (SNR) of voice signal picked up by a microphone, allowing remote user to hear speech by the user of the communication earphone clearly. On the other hand, it is necessary to enhance SNR of voice at the receiving end of the communication earphone, allowing local earphone wearer to hear voice signal sent from the remote user clearly.

At present, common speech enhancing methods for sending end of a communication earphone are mainly to utilize a single or multiple common microphone to pick up signals and then realize speech enhancement with acoustics signal processing method.

Speech enhancement with a single microphone is generally referred to as single channel spectral subtraction speech enhancement technology (see China patent of invention publications CN1684143A and CN101477800A). This technology generally estimates energy of stationary noise in current voice by analyzing historical data and then achieve speech enhancement by canceling noise in voice with spectral subtraction method. However, this method can only suppress steady noise such as white noise and has limited noise reduction amount. Too big noise reduction amount may impair voice and for nonsteady noise such as surrounding voice noise and knocking noise, it is impossible to estimate its energy accurately, and hence impossible to cancel it effectively.

Another method that can effectively suppress nonsteady noise is to apply the speech enhancement technology with microphone array consisting of two or more microphones (see China patent of invention publications CN101466055A and CN1967158A). With this technology, generally, a signal received by one microphone is used as reference signal, and noise component in signal picked up by another microphone is estimated and canceled out in real time with an adaptive filtering method, while leaving speech component, hence achieving speech enhancement purpose. The multi-microphone technology may suppress nonsteady noise and has noise reduction amount greater than that of single microphone technology. However, this method requires accurate detection of speech state, otherwise the speech may be canceled as noise.

Some prior multi-microphone technologies use directive microphones (see China patent of invention publication CN101466055A) or a plurality of microphones to form directivity (see China patent of invention publication CN101466056A) to detect voice from a specific direction, which is only applicable to the case of fixed microphone array shape and fixed location and direction with respect to user. When the user deviate from the directing scope of the microphone array or the shape or position of microphone array changes resulting microphone array direction deviating the user, the speech may be suppressed as noise. The case is for example as shown in FIG. 1, in which the microphone is mounted on earphone flexible cord.

In the communication earphone shown in FIG. 1, the microphone 112 is mounted on the earphone flexible cord. In specific application process, this earphone microphone is not fixed relative to the user's mouth and it forms a microphone array with non-fixed shape together with microphones mounted on other positions of the earphone. In communication, the user would place the microphone on flexible cord at any location near the mouth. When the user places the microphone outside the directivity scope of the microphone array, speech may be treated as noise and then it is impossible to detect speech accurately with the directivity of microphone array.

Speech enhancing methods commonly used presently at receiving end of communication earphone mainly adopt two technologies. One is to adopt an automatic volume control technology (see China patent of invention publication CN1507293A), i.e, automatically enhancing power supplied to the speaker unit when outside noise is high, which is a passive method limited by the industry standard for power of speaker unit itself and the sound pressure fed into ears by an inserted earplug. It is not possible to enhance volume of speaker unit unlimitedly, and the high intensity speech emitted by the speaker may damage the user's audition and physical and mental health. Another method is to apply a noise control technology that combines traditional active/passive technologies to a communication earphone (see China patent of invention publication CN101432798A). The earphone may be classified into head worn and earplug. The earplug type earphone typically takes a sealed coupling form between leather sheathes and ears. On the one hand, sound absorption and sound isolation of materials is used to depress intermediate and high frequency noise. On the other hand, low frequency (mainly below 300 Hz) noise is effectively depressed with active noise control technologies, thus realizing good control over outside noise in the full band and enhancing SNR of speech at the receiving end of communication earphone effectively.

SUMMARY OF THE INVENTION

Technical Problem

However, by long time wearing sealed communication earphone in earplug type, a user may feel unbalanced air pressure between inside and outside of the auditory canal. Therefore, discomfort when wearing the earphone is the main factor that constraints this configuration of active noise reduction technique from being widely used in communication earphones.

In addition, communication under strong noise circumstance requires noise reduction and enhancement for speech at both sending and receiving ends simultaneously (see China patent of invention CN101853667A). For this technology in which speech enhancement for both communication sides is realized by adaptive filtering plus single channel noise reduction at the sending end and implementing closed feedback active noise reduction at the receiving end respectively, besides the above-mentioned limitations at sending and receiving ends respectively, there is also a problem that it's impossible to guarantee correlation and causality of noise, since the noise reference signal for local adaptive filtering is taken from the closed feedback active noise control system at the receiving end.

Technical Solution

In view of the above problem, an object of the present invention is to provide a technology for speech enhancement and noise reduction by multiplexing signals collected by a plurality of microphones, wherein the speech enhancement technology at the sending end identifies wearing condition of earphone according to energy difference of speech signals picked up by a plurality of microphones to select different noise reduction method, thereby ensuring speech will not be damaged no matter how the earphone is worn and achieving good noise reduction effect in case of normal wearing. While the non-closed feed-forward active noise control technology is applied to the receiving end to ensure comfortable wearing of earphones while reducing noise.

In accordance with one aspect of the present invention, there is provided a speech enhancing method for a communication earphone, said communication earphone comprising a sending end consisting of at least two microphones and a receiving end consisting of at least one microphone and one speaker, said method implementing noise reduction at the sending end and the receiving end of said communication earphone respectively by multiplexing a plurality of microphones' signals, wherein the noise reduction at said sending end comprises:

Determining a condition in which the communication earphone is worn by comparing difference in energies of sound signals picked up by microphones of the communication earphone with a preset threshold; if said energy difference is greater than a first preset threshold, it is determined that said communication earphone is normally worn, and said sound signal being first subjected to multi-microphone noise reduction and then to single channel noise reduction to further suppress residuary stationary noise; otherwise, it is determined that said communication earphone is abnormally worn and suppressing stationary noise in said sound signal directly by single channel noise reduction.

A preferred scheme is as follows: the process of subjecting said sound signal to multi-microphone noise reduction specifically comprises: distinguishing speech signal components and noise signal components in said sound signal by comparing energy difference among components of various frequencies in said sound signal; subjecting said noise signal components to attenuation processing.

According to another aspect of the present invention, there is provided a communication earphone comprising a sending end consisting of at least two microphones and a receiving end consisting of at least one microphone and one speaker as well as a sending end noise reduction unit and a receiving end noise reduction unit, wherein said sending end noise reduction unit comprises:

a wearing condition determining module configured to determine a wearing condition of said communication earphone by comparing with a preset threshold an difference in energies of sound signals picked up by microphones constituting said sending end, and if said energy difference is greater than a first preset threshold, it is determined that said communication earphone is normally worn, otherwise determining that said communication earphone is abnormally worn;

a multi-microphone noise reduction module configured to subject said sound signal to multi-microphone noise reduction processing when said communication earphone is normally worn;

a single channel noise reduction module configured to further suppress residuary stationary noise after said multi-microphone noise reduction module has subjected said sound signal to noise reduction processing, or to directly suppress the stationary noise in said sound signal if said communication earphone is abnormally worn.

According to another aspect of the present invention, there is provided a speech enhancement device including a sending end noise reduction unit and a receiving end noise reduction unit wherein said sending end noise reduction unit includes:

a sending end noise reduction mode determining module configured to determine a noise reduction mode for said sending end by comparing an energy difference of sound signals picked up by microphones of said sending end;

a multi-microphone noise reduction module configured to subject said sound signal to multi-microphone noise reduction processing when said energy difference is greater than a first preset threshold;

a single channel noise reduction module configured to further suppress residuary stationary noise after said multi-microphone noise reduction module has subjected said sound signal to noise reduction processing, and subject stationary noise in said sound signal to suppressing process directly when said energy difference is less than or equal to said first preset threshold.

In addition, at the receiving end, the earplug design of the present invention takes a non-closed inserting structure to be inserted into ears to ensure comfort for long time wearing and at the same time, the feed-forward active noise control technology is implemented on the non-closed earphone to reduce noise on speech frequency band, ensuring high SNR of speech at the receiving end.

In one preferred implementation of the present invention, a howling detection unit is further added to adjust noise reduction processing mode for the receiving end in time by detecting a change of the sound signals picked up at the sending end, hence enhancing robustness of the system.

With the above-mentioned speech enhancing method for communication earphones, the communication earphone and the speech enhancement device according to the present invention, it is possible to effectively multiplex signals picked up by a plurality of microphones, and meanwhile acoustics signal processing methods are applied at both sending and receiving end of the communication earphones for speech enhancement, thereby ensuring high SNR of speech at both local and remote sides under noisy environment, providing highly clear and understandable speech signal for both sides.

To achieve the above described and related objects, one or more aspects of the present invention include features that will be described in detail hereinbelow and specifically defined in claims. The following description and accompanying drawings elaborate some illustrative aspects of the present invention. However, these aspects only illustrate some of the various modes in which the principle of the present invention may be applied. Furthermore, it is intended that the present invention comprises all these aspects and their equivalents.

BRIEF DESCRIPTION OF DRAWINGS

Other purposes and results of the present invention will be more clear and easy to understand by reference to the description with respect to drawings and contents of claims, and with more comprehensive understanding of the present invention. In the drawings:

Identical reference numerals indicate similar or corresponding features or functions throughout the figures.

EMBODIMENTS

In order to overcome shortages with prior art noise reduction solutions and effectively attenuate and suppress noise without damaging voice signal, according to the present invention, noise reduction is implemented at both sending end and receiving end at the same time and wearing conditions of the earphones are identified according to specific features of sound signals received by the multiple microphones, which primarily is the difference of energies between speech signal components and noise signal components contained therein, and respective speech enhancement and noise reduction methods are applied to make the noise reduction processing more targeted, hence ensuring speech quality and better noise reduction.

In the following, the flow of speech enhancing method and device structure proposed in the present invention will be described in detail with a common communication earphone as an example.

The speech enhancing method for communication earphone according to the present invention relies essentially in effectively multiplexing sound signals collected by a microphone array, at the sending and receiving ends of a communication earphone, multi-microphone speech enhancement technology and non-closed feed-forward active noise control technology are applied respectively to enhance SNRs of speech at sending and receiving ends of a communication earphone under noisy environment, hence ensuring definition and intelligibility of speech in communication.

The present invention proposes a multi-microphone noise reduction technology at the sending end by recognition wearing condition of the user, which detects speech without using microphone directivity, but identify different wearing conditions of the user by detecting energy difference between a master signal and a reference signal in sound signals picked by microphone, so as to apply different noise reduction methods accordingly, thereby ensuring that noise reduction will not damage speech in case of non-fixed position or shape of the microphone. At the receiving end, the present invention adopts the non-closed feed-forward active noise control technology to effectively depressing noise signal in speech frequency band while ensuring wearing comfortability.

Specific embodiments of the present invention will be described in detail below with reference to the accompanying figures.

Figure 1:
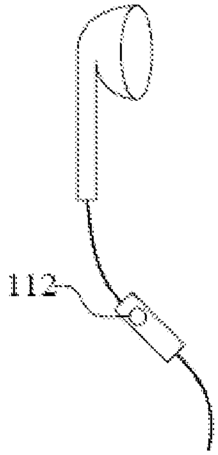
Fig. 1 (Prior Art)
FIG. 1 is a schematic diagram showing a configuration in prior art wherein a microphone is assembled on a communication earphone.
Figure 2:
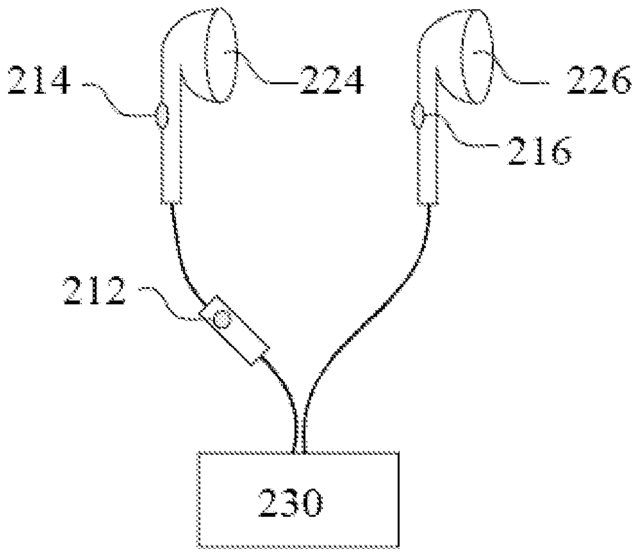
FIG. 2 is a diagram schematically showing structure of a communication earphone according to an embodiment of the present invention.

The speech enhancing method provided in the present invention for communication earphone implements noise reduction at both sending end and receiving end. Since in the present invention, noise reduction is implemented on the basis of multiplexing sound signal collected by microphones, the communication earphone adopted in the present invention includes a sending end consisting of at least two microphones, a receiving end consisting of at least one microphone and one speaker and a host for implementing noise reduction processing with respect to sound signals. FIG. 2 is a diagram schematically showing structure of a communication earphone according to an embodiment of the present invention.

As shown in FIG. 2, the in-ear part of the communication earphone which is used in the present embodiment is a non-closed in-ear earplug, which can couple well with an ear, and be worn firmly and avoid complete sealing of ear canal, ensuring comfortability for long time wearing. The communication earphone includes a sending end, a receiving end, an earphone cord and a host 230, wherein the sending end utilizes signals collected by three microphones, the microphone 212 is fixed on the earphone cord, and the microphones 214 and 216 are mounted on the back of earphone rack post with opening facing outward. The receiving end includes two microphones 214 and 216 and two speakers 224 and 226.

Figure 8:
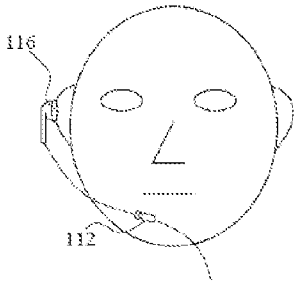
FIG. 8 is a schematic diagram showing normal wearing condition of the earphone according to an embodiment of the present invention.

Regarding this communication earphone, when the earphone is normally worn, the user may place the microphone 212 fixed to the earphone cord nearby his mouth (as shown in FIG. 8) for communication. Since the microphone 212 is close to the mouth, capable of picking up sound signal with high SNR, this microphone 212 will be regarded as the primary microphone. Since the microphones 214 and 216 are mounted on the back of earphone rack post with openings facing outward, and when the communication earphone is normally used, they are far away from the mouth, it is convenient for them to pick up good noise reference signal, these two microphones are regarded as reference microphones.

Figure 3:
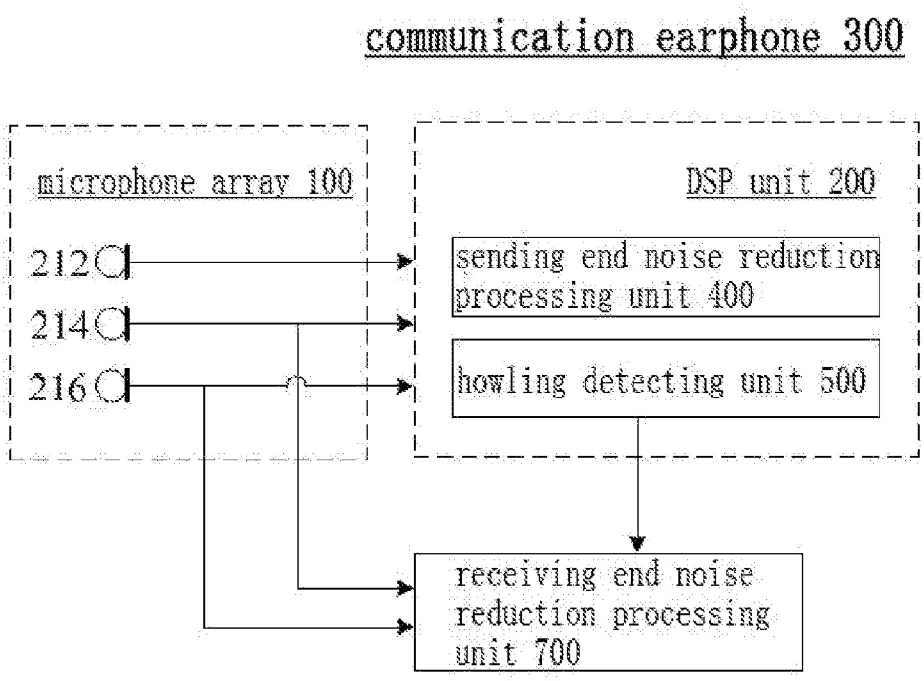
FIG. 3 is a diagram schematically showing the structure of a communication earphone according to an embodiment of the present invention.

According to one specific implementation of the present invention, a communication earphone 300 applies three microphones, of which a block diagram is shown in FIG. 3, wherein the host side includes a DSP unit 200 and a receiving end noise reduction unit 700 consisting of analog circuits, the sending end noise reduction unit 400 of the DSP section fulfills speech enhancement at the sending end and at the same time a howling detection unit 500 provides a control signal for howling detection for the receiving end speech enhancement module; and a receiving end noise reduction unit 700 implements noise reduction at the receiving end for speech signals. Among them, the host side may be separately realized with DSP plus some analog circuits and may also be realized as a part of some audio equipment or a cellular phone.

Notably, although the embodiment shown in FIG. 3 employs 3 microphones, other number of microphones may also be used in specific applications of the present invention, say, only two microphones such as 214 and 216 each mounted on the rack post. Then there is no difference between the primary microphone and the reference microphone, it is enough to use only the single channel noise reduction mode. If two microphones such as 212 and 214 mounted on the earphone cord and the back of rack post respectively are employed, the multi-microphone noise reduction mode and/or single channel noise reduction mode may be chosen according to user's wearing condition. Alternatively, more microphones may be used according to specific requirements for communication products to better pick up useful speech signal and noise signal, then it is possible to determine whether there are primary and secondary microphones based on sound signals picked up specifically by microphones and adopt a respective noise reduction mode accordingly.

The speech enhancing method and device according to the present invention will be described below in terms of two sections, i.e., sending end and receiving end.

Figure 4:
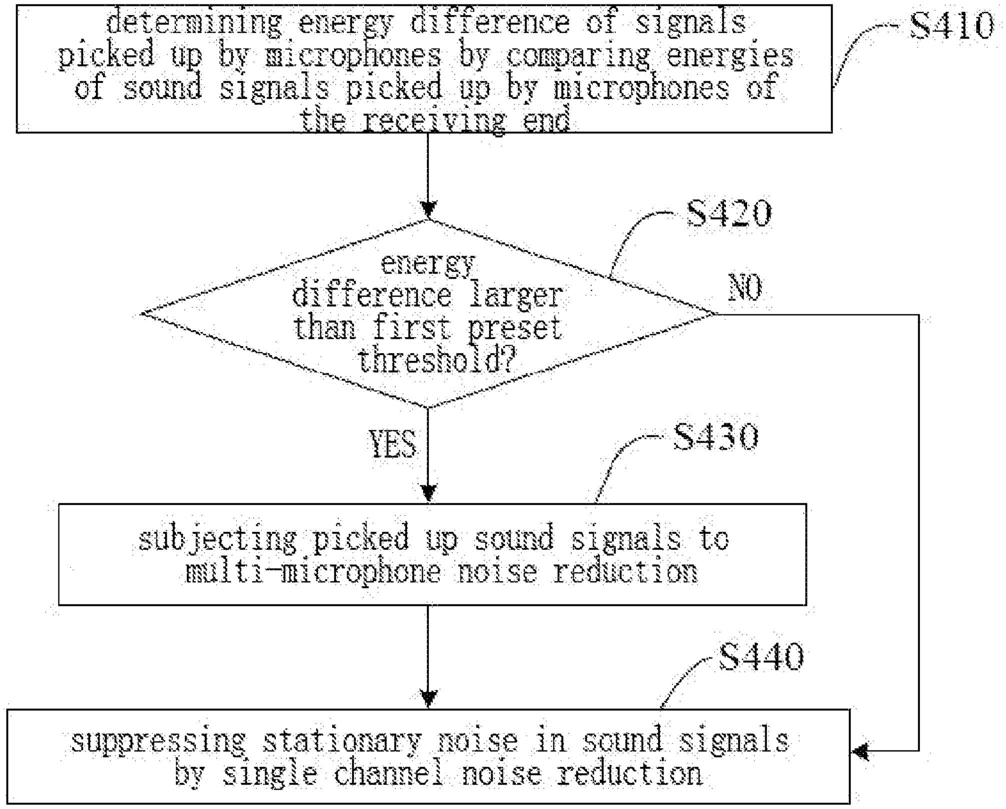
FIG. 4 is a flow chart showing the section of sending end noise reduction processing in a speech enhancing method for a communication earphone according to the present invention.

FIG. 4 is a flow chart showing a noise reduction processing at the sending end in a speech enhancing method for a communication earphone according to the present invention.

Figure 9:
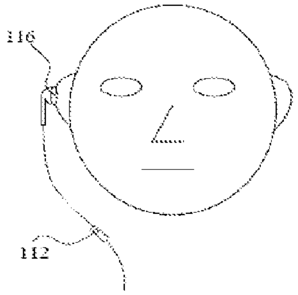
FIG. 9 is a schematic diagram showing abnormal wearing condition of the earphone according to an embodiment of the present invention.

As shown in FIG. 4, the flow of the noise reduction processing for the sending end includes:

S410: determining energy difference between signals picked up by microphones at receiving end of the communication earphone by comparing energies of sound signals picked up by the microphones, wherein a sound signal includes a speech signal and a noise signal;

S420: identifying wearing condition of the earphone by determining whether the obtained energy difference is greater than a first preset threshold, if greater than the first preset threshold, the earphone is normally worn as shown in FIG. 8, the flow proceeds to step S430, otherwise the earphone is abnormally worn as shown in FIG. 9, the flow proceeds to step S440;

S430: subjecting the picked up sound signal to multi-microphone noise reduction;

S440: suppressing stationary noise in the sound signal by single channel noise reduction.

Figure 5:
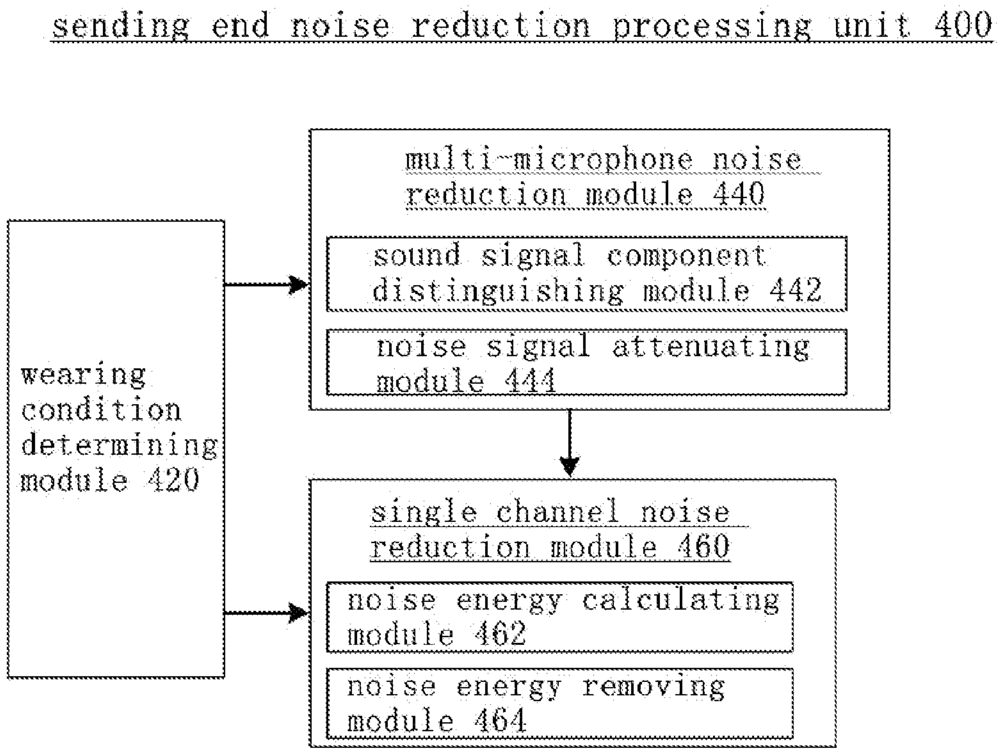
FIG. 5 is a schematic diagram showing a logical structure of a sending end noise reduction unit according to an embodiment of the present invention.

FIG. 5 is a schematic diagram showing a logical structure of a sending end noise reduction unit that uses acoustic signal processing method for speech enhancement at the sending end of the communication earphone according to an embodiment of the present invention.

As shown in FIG. 5, the sending end noise reduction unit 400 includes a wearing condition determining module 420, a multi-microphone noise reduction module 440 and single channel noise reduction module 460.

Among them, the wearing condition determining unit 420 is configured to determine wearing condition of communication earphones by comparing energy difference of sound signals picked up by microphones consisting the sending end, if the energy difference is greater than a first preset threshold, it is determined said communication earphone is normally worn, otherwise, it is determined that said communication earphone is abnormally worn, wherein the picked up sound signal includes a speech signal and a noise signal.

The multi-microphone noise reduction module 440 is configured to subject the picked up sound signal to multi-microphone noise reduction processing if the above-mentioned energy difference is greater than the first preset threshold and the communication earphone is normally worn.

The single channel noise reduction module 460 is configured to further suppress residuary stationary noise after the multi-microphone noise reduction module 440 has subjected the sound signal to noise reduction processing, and subject stationary noise in the sound signal to suppressing processing directly if the above-mentioned energy difference is less than or equal to the first preset threshold and the communication earphone is in abnormal wearing condition.

The noise reduction processing method at the sending end and the noise reduction processing module of the present invention will be described in more detail below with reference to FIGS. 3, 4 and 5.

When the earplug of the communication earphone is in wearing condition, the distances and positions of microphone 214 and 216, which are regarded as reference microphones in the present invention, with respect to the mouth are substantially determined, the sound signals picked up by microphone 214 and 216 are regarded as reference signals. When normally used, microphone 212 is placed to a position very close to mouth of a user, which is regarded as the primary microphone in the present invention and the picked up sound signal is regarded as primary signal.

However, there is a large uncertainty for the position of the microphone 212 in practical use. It may be very close to the mouth or may be at a distance to the mouth equivalent to that of microphones 214 and 216. Typically, it is defined as normal wearing mode where the microphone 212 is close to the mouth, in which case the microphone 212 picks up a primary signal stronger than the reference signal picked up by microphones 214 and 216, in a general communication environment in a voice-sending state, the primary signal is typically higher than the reference signal by 6 dB or more; while it's defined as an abnormal wearing mode when the microphone 212 moves away from the mouth, in which case the microphone 212 picks up a primary signal with energy approximated to that of the reference signals picked up by microphones 214 and 216. With this feature, it is possible to determine whether the earphone is in normal wearing condition by comparing energy difference between sound signals picked up by the primary and reference microphone respectively given that the primary microphone and the reference microphone have been distinguished.

Specifically, as an example, in the process of determining the energy difference, firstly, signals collected by the primary microphone 212 and the reference microphone 214 are grouped into two frames of data respectively with each frame consisting of N (N=512) sampling points. Sums of energy for the two frames of data, P_112 and P_114 are evaluated. Then the ratio of energy sum Rp=P_112/P_114 is calculated. When Rp is greater than a threshold Rth (e.g., Rth>6 dB), it is a normal wearing mode, in which case the sound signal is subjected to multi-microphone noise reduction processing by using the multi-microphone noise reduction unit 460 subjects and then to single channel noise reduction. When Rp is smaller than the threshold Rth, it's an abnormal wearing mode, it is impossible to distinguish speech and noise very well. If the multi-microphone noise reduction is also applied, speech may be suppressed as noise, therefore only single channel noise reduction unit 480 is used for noise reduction to avoid speech damage.

Among them, the multi-microphone noise reduction module 440 includes a sound signal component distinguishing module 442 and a noise signal attenuating module 444. The sound signal component distinguishing module 442 is configured to evaluate energy difference among frequency components in the sound signal to distinguish speech signal components and noise signal components in the sound signal. The noise signal attenuating module 444 is configured to subject the noise signal components distinguished by the sound signal component distinguishing module 442 to attenuation processing.

Specifically, for example, when a user is normally wearing the earphone, speech signal components picked up by the microphone 212 in the near field are larger than those picked by microphones 214 and 216 by 6 dB or more, while microphones 214, 216 and 212 pick up noise components having equivalent energies. Therefore, the multi-microphone noise reduction unit 460 utilizes the energy difference among frequency components in signals picked up by the microphone 212 and the microphone 214 (namely, primary microphone and reference microphone) to distinguish speech component from noise component and subjects noise components to noise reduction processing.

First of all, the sound signal component distinguishing module 442 distinguishes speech signal and noise signal. The specific processing thereof includes:

Subjecting one frame of data of microphones 112 and 214 to fast Fourier transform respectively to transform time domain data into frequency components Fi_112 and Fi_114 (i stands for the $i^{th}$ frequency component);

Calculating energy Pi_112 and Pi_114 for each frequency and comparing energies of each frequency component to obtain an energy ratio Ri=Pi_112/Pi_114;

When Ri is greater than a threshold Rthi (Rthi>6 dB), the $i^{th}$ frequency component is determined as speech; when Ri is smaller than Rthi (Rthi>6 dB), the $i^{th}$ frequency component is noise.

Then, the speech component is kept, and the noise signal attenuating module 444 attenuates the noise components. That is, when Ri is greater than threshold Rthi (Rthi>6 dB), Fi_112 is left as is; when Ri is smaller than threshold Rthi (Rthi>6 dB), Fi_112 is multiplied by a gain Gi (0<Gi<1) to achieve noise reduction effect.

Finally, the processed Fi_112 is subjected to reverse Fourier transform to obtain pure speech signal where noise has been reduced.

The principle of noise reduction of the single channel noise reduction module 460 in the present invention is as follows: since noises are statistically steady, energy of steady noise in each frequency band of input signal is calculated and then canceled. In one implementation of the present invention, the single channel noise reduction module 460 includes a noise energy calculating module 462 and a noise energy canceling module 464, wherein the noise energy calculating module 462 is configured to calculate noise energy of various frequencies in the sound signal with a smoothing averaging method; and the noise energy canceling module 464 is configured to cancel noise energy calculated by the noise energy calculating module 462 in the sound signal so as to further reduce noise components and reserve speech components, realizing the effect of enhancing SNR of speech signal.

In the present invention, the feed-forward active noise control method is applied at the receiving end for noise reduction. The in-ear part of the communication earphone takes non-closed earplug structure, which mainly serves to ensure a constant air pressure inside ear canal before and after the wearing earphone, so as to ensure comfort for long time wearing. While a microphone adopting feed-forward active noise control is generally located at an external surface of the communication earphone to pick up as much as possible outside noises. Therefore, this communication earphone applying feed-forward active noise control is configured to generally satisfy causality required by the system. Sound propagating from front of the microphone necessarily arrives at the microphone first, then arrives at ears, and noises coming in other directions are basically also picked up by the microphone first, since it has to be diffracted by the head.

Figure 6:
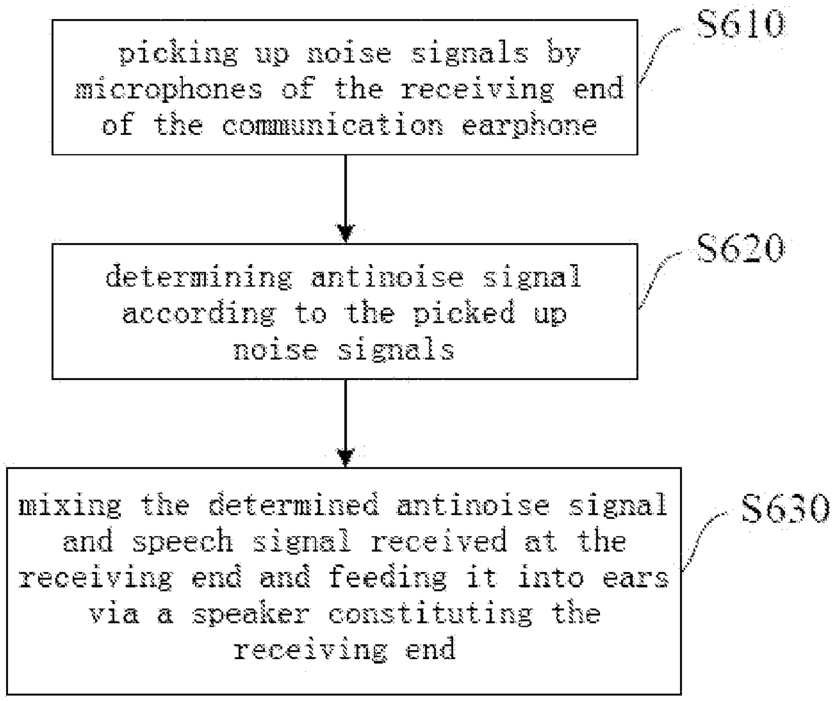
FIG. 6 is a flow chart showing the section of receiving end noise reduction processing in a speech enhancing method for a communication earphone according to the present invention.

FIG. 6 is a flow chart showing the section of noise reduction processing in a speech enhancing method at the receiving end of a communication earphone according to the present invention.

As shown in FIG. 6, in the present invention, the process of applying the feed-forward active noise control method at the receiving end to reduce noise signal in the frequency band of the received speech specifically includes:

S610: picking up a noise signal by the microphone at the receiving end of the communication earphone;

S620: determining an antinoise signal according to the picked up noise signal;

S630: superimposing the determined antinoise signal and the speech signal received at the receiving end and then feeding it into ears via a speaker constituting the receiving end, with said antinoise and the original noise entering ears being canceled out with each other while the speech signal remaining unchanged, thus reducing the noise signal in the frequency band of received speech.

Further, in the process of determining antinoise signal according to noise signal in step S620, first inverting the noise signal by an inverter to obtain a primary antinoise signal; then utilizing a phase compensator to modify and adjust the phase of the primary antinoise signal in the range of audio frequency, so as to obtain the antinoise signal with a phase exactly opposite to that of said noise signal, and applying an active filter implemented by twin T network to compensate for phase loss at low frequency part caused by the non-closed structure.

Figure 7:
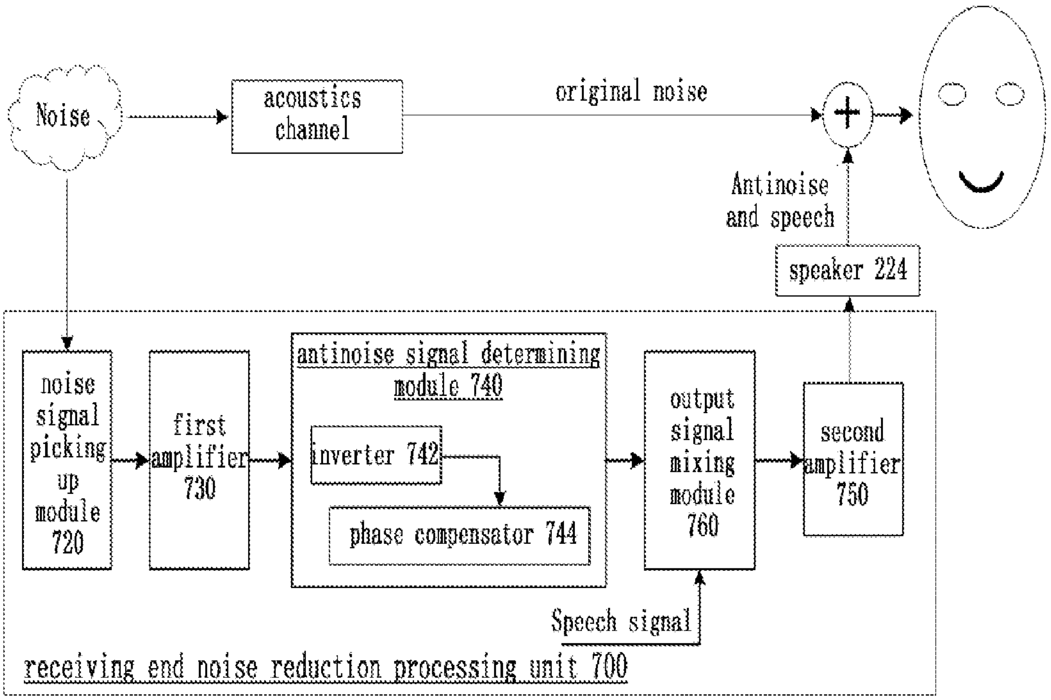
FIG. 7 is a schematic diagram showing a logical structure of a receiving end noise reduction unit according to an embodiment of the present invention.

FIG. 7 is a schematic diagram showing a logical structure of a receiving end noise reduction unit according to an embodiment of the present invention.

As shown in FIG. 7, the receiving end noise reduction unit 700 includes a noise signal determining module 720, an antinoise signal determining module 740 and an output signal mixing module 760, wherein the antinoise signal determining module 740 may include an inverter 743 and a phase compensator 744.

The noise signal picking module 720 is configured to pick up a noise signal with the microphone at the receiving end of the communication earphone. Since when the receiving end is receiving speech signal from far field, the sound signal picked up by the microphone is generally regarded as a noise signal totally, the microphones 214 and 216 mounted on the back of earphone rack post are equivalent to the noise signal picking module 720. The antinoise signal determining module 740 is configured to obtain an antinoise signal according to the noise signal determined by the noise signal determining module 720. The output signal mixing module 760 is configured to superimpose the antinoise signal obtained by the antinoise signal determining module 740 and the speech signal received at the receiving end and then feeding it into ears via a speaker 224 constituting the receiving end, with said antinoise and the original noise entering ears (transmitting via natural acoustics channel) being canceled out with each other while speech signal remaining unchanged, thus reducing the noise signal in the frequency band of received speech.

The inverter 742 is configured to invert said noise signal and obtain the primary antinoise signal.

The phase compensator 744 is configured to modify and adjust the phase of the primary antinoise signal in the range of audio frequency, and obtain an antinoise signal with a phase exactly opposite to that of said noise signal, and apply an active filter implemented by twin T network to compensate for phase loss at low frequency part caused by the non-closed structure.

In addition, the receiving end noise reduction unit 700 may further include a first amplifier 730 and second amplifier 750, wherein the first amplifier 730 is configured to amplify the noise signal picked up by the noise signal picking module 720, and the second amplifier 750 is configured to amplify the mixed signal resulted from superimposing the antinoise signal and speech signal.

Specifically, as an example, the noise signal picked up by the microphone 214 is amplified by a first pre-amplifier 730, and then processed by an inverter 742 and a phase compensator 744 to generate an antinoise signal with identical amplitude and opposite phase with respect to the original noise.

The phase compensator 744 mainly functions to address time delay problem with the feed-forward active noise control technology when applied to a non-closed communication earphone, which modifies and adjusts the phase of the antinoise signal in audio frequency range accordingly by using the circuits to allow the antinoise has a phase exactly opposite to that of the original noise. It's generally implemented by using a passive or active twin T network.

The antinoise signal and the input speech signal are mixed via an output signal mixing module consisting of an adder to be input to the second amplifier 750 as a back end that amplifying the mixed signal including antinoise and speech signal to drive speaker 224 directly.

Similarly, the noise signal picked up by the microphone 216 is amplified by the first pre-amplifier 730, inverted by the inverter 742, compensated by the phase compensator 744, mixed by the adder and amplified by the second amplifier 750, and then drives the speaker 226 directly.

The first pre-amplifier 730 of the microphone, the inverter 742, the phase compensator 744, the adder, the second power amplifier 750 of the speaker may separately be implemented by individual devices, and it is also possible to implement one or several module's functions with one device.

The mixed signal resultant from superimposing an antinoise and speech signal is converted into acoustic signal via the speaker to be fed into ears, the antinoise signal emitted from the speaker and the original noise signal propagated into ears from an acoustics channel have same amplitude and opposite phases, therefore they may be superposed with each other and canceled out at ears, thereby canceling original noise and antinoise at the same time. Therefore, noise is reduced, while speech energy remains unchanged, which effectively enhances SNR of a speech signal and what propagates into ears will be clear, understandable and pure speech signal.

For conventional earphone adopting enclosed feed-forward active noise control, outside noise must pass through passive sound insulation material to propagate from the reference microphone to ears, which would increase delay of the acoustics channel, thereby allowing longer time for processing for the electronic channel to ensure causality of the system. In order to address the time delay problem with the feed-forward active noise control technology when applied to a communication earphone in non-closed structure, it is necessary to design the system in two aspects. First, a good design and processing is needed for front and back cavity of the individual speaker, the size and opening of the front and back cavity need to be adjusted to improve phase response in audio frequency range from the speaker to ears. Secondly, it is necessary to phase compensate the inverter via the circuit to modify and compensate for time delay using the circuit itself, in the hope of good noise reduction effect in the entire audio frequency range.

From the viewpoint of distance design between the microphone and ears, on the one hand, it is expected the closer the better. The closer the microphone is from the ears, the better the noise relevance of the two points is, the better the noise cancellation is. On the other hand, it is required that there is a certain distance between the microphone and ears to allow a longer time for electronic processing, during which noise is propagating from microphone to ears. In addition, it is necessary to keep a certain spatial distance and good acoustics isolation between the microphone and speaker to prevent signals emitted by the speaker from being picked up by the microphone, avoiding that noise signal picked up by the microphone includes useful speech signal and avoiding a feedback loop with feedback howling in this system. If there is any feedback loop, there may be howling phenomena if the system gain is too high.

In addition, for the earphone applying non-closed feed-forward active noise reduction, there is an intrinsic leaking channel between the speaker and the reference microphone that picks up outside noise. When the earphone is normally worn, the acoustics transfer function between the speaker and the reference microphone has very small amplitude, therefore in normal use, the non-closed feed-forward active noise control technology will not degrade speech signal and the system has no howling phenomena. However, when the earphone is placed in a closed or semi-closed space, the amplitude of the acoustics transfer function between the speaker and the reference microphone will increase sharply, especially for the high frequency part.

This kind of acoustics transfer function with large amplitude, together with a control circuit with high gain, forms a closed loop feedback system, and when the amplitude and phase of the closed loop feedback system satisfy certain conditions, the system will encounter self-excitation howling, which is a robustness problem.

Therefore, in one preferred implementation of the present invention, the DSP unit further includes a howling detection unit for providing a howling detection control signal to the receiving end speech enhancement module. Specifically, when energy of a certain frequency in a frequency spectrum of the sound signal picked up by the microphone of the communication earphone is higher than energy of other frequency band by a preset value or more and the energy of this certain frequency is increasing continuously, the noise reduction processing at the receiving end is autonomously modulated by the control signal.

Generally, if it is determined that the energy at a certain frequency is higher than energy of other frequency band by 10 dB or more and the energy at this frequency is still increasing, it is determined that the system is in abnormal condition, and the howling detection unit would output a control signal to modulate the active noise control circuit. The control mode may be implemented by lowering the gain of the first amplifier or directly disconnecting the power supply of the active noise control circuit.

For speech signals at the sending end and receiving end, it may be connected with other equipments in a wired mode, or in a wireless mode such as Blue Tooth.

In the above, a technology and device for enhancing SNR of speech at sending and receiving end of a communication earphone in noisy environment according to the present invention have been described with respect to drawings and multiple specific implementations. It is understood that those skilled in the art can implement various applications and modifications to the specific device and technology disclosed herein without any creative efforts and without departing from the concept of the present invention and the applications and modifications may be different from specific device and technology disclosed herein. Therefore, the present invention should be understood to include each novel feature and the combination thereof demonstrated by means of the device and technology disclosed herein, and all equivalent modifications and changes made by those of ordinary skill in the art according to contents disclosed by the present invention fall within the protection scope defined in the claims.

What is claimed is:

1. A speech enhancing method for a communication earphone, said communication earphone comprising a sending end comprising at least two microphones; and a receiving end comprising at least one microphone and a speaker, wherein said speech enhancing method comprises:

implementing noise reduction at both said sending end and said receiving end of said communication earphone respectively by multiplexing sound signals picked up by the microphones of the said sending end, wherein the noise reduction processing at said sending end comprises:

determining a wearing condition of said communication earphone by determining an energy difference among the sound signals picked up by the at least two microphones of said sending end;

if said energy difference is greater than a first preset threshold, determining that said communication earphone is normally worn, said sound signals being first processed by multi-microphone noise reduction processing and then processed by single channel noise reduction processing to further suppress residuary stationary noise; and if said energy difference is smaller than or equal to the first preset threshold, determining that said communication earphone is abnormally worn and suppressing stationary noise in said sound signals directly by the single channel noise reduction.

2. The speech enhancing method for the communication earphone according to claim 1, wherein multi-microphone noise reduction processing comprises:

distinguishing speech signal components and noise signal components in said sound signals by comparing the energy difference among frequency components in said sound signals; and subjecting said noise signal components to attenuation processing.

3. The speech enhancing method for the communication earphone according to claim 2, wherein in the process of distinguishing the speech signal components and the noise signal components in said sound signals by comparing the energy difference among frequency components in said sound signals, if the energy difference of a certain frequency component in said sound signals is greater than a second preset threshold, the frequency component of which the energy difference is greater than said second preset threshold is determined as a speech signal component; and if the energy difference of a certain frequency component in said sound signals is less than or equal to said second preset threshold, the frequency component of which the energy difference is less than or equal to said second preset threshold is determined as a noise signal component.

4. The speech enhancing method for the communication earphone according to claim 1, wherein the process of suppressing stationary noise by single channel noise reduction comprises:

calculating energies of noises of various frequencies in said sound signals by a smooth-average method; and removing the energies of noises in said sound signals.

5. The speech enhancing method for the communication earphone according to claim 1, wherein an in-ear part of said communication earphone has a non-closed earplug structure, and a position where the speaker of said communication earphone is coupled with an ear canal is relatively constant under normal wearing condition; and the noise reduction processing at said receiving end comprises:

utilizing the microphones constituting the receiving end to pick up a noise signal;

obtaining an antinoise signal according to said noise signal; and mixing the antinoise signal with a speech signal received by the receiving end and feeding the antinoise signal and the speech signal into ears via the speaker constituting the receiving end.

6. The speech enhancing method for the communication earphone according to claim 5, wherein the obtaining the antinoise signal according to said noise signal, comprises:

inverting said noise signal by an inverter to obtain a primary antinoise signal; and modifying and adjusting a phase of said primary antinoise signal in audio frequency range utilizing a phase compensator, to obtain an antinoise signal with a phase exactly opposite to that of said noise signal, wherein said phase compensator comprises an active filter implemented by a twin T network to compensate for phase loss at low frequency part caused by the non-closed earplug structure.

7. The speech enhancing method for communication earphone according to claim 1, further comprising a process of detecting and suppressing howling, wherein the process comprises:

if an energy of a certain frequency of a frequency spectrum of the sound signals picked up by the microphones of said communication earphone is higher than that of other frequency bands by a preset value or more and the energy of the certain frequency is still increasing, then autonomously adjusting the noise reduction at said receiving end.

8. A communication earphone comprising:

a sending end comprising at least two microphones;

a receiving end comprising at least one microphone and a speaker;

a sending end noise reduction unit; and a receiving end noise reduction unit, wherein said sending end noise reduction unit comprises:

a wearing condition determining module configured to determine a wearing condition of said communication earphone by comparing an energy difference of sound signals picked up by the at least two microphones of said sending end, and wherein, if said energy difference is greater than a first preset threshold, the wearing condition determining module is configured to determine that said communication earphone is normally worn, and if the energy difference is smaller than or equal to the first preset threshold, the wearing condition determining module is configured to determine that said communication earphone is abnormally worn;

a multi-microphone noise reduction module configured to subject said sound signals to multi-microphone noise reduction processing when said communication earphone is normally worn; and a single channel noise reduction module configured to, if said communication earphone is normally worn, further suppress residuary stationary noise after said multi-microphone noise reduction module has subjected said sound signals to noise reduction processing, and configured to, if said communication earphone is abnormally worn, subject steady state noise in said sound signals to suppressing processing.

9. The communication earphone according to claim 8, wherein said multi-microphone noise reduction module further comprises:

a sound signal component distinguishing module configured to distinguish speech signal components and noise signal components in said sound signals by comparing energy difference among frequency components in said sound signals; and a noise signal attenuating module configured to subject said noise signal components to attenuation processing.

10. The communication earphone according to claim 8, wherein said single channel noise reduction module further comprises:

a noise energy calculating module configured to calculate noise energies of various frequencies in said sound signals by a smooth-average method; and a noise energy removing module configured to remove said noise energy in said sound signals.

11. The communication earphone according to claim 8, wherein an in-ear part of said communication earphone has a non-closed earplug structure, and a position where the speaker of said communication earphone is coupled with an ear canal is relatively constant under normal wearing condition; and said receiving end noise reduction unit comprises:

a noise signal picking up module configured to pick up a noise signal utilizing the microphones of said receiving end;

an antinoise signal determining module configured to obtain an antinoise signal according to said noise signal; and an output signal mixing module configured to superimpose said antinoise signal and a speech signal received by the receiving end and feed said antinoise signal and said speech signal into ears via the speaker of said receiving end.

12. The communication earphone according to claim 11, wherein said antinoise signal determining module further comprises:

an inverter configured to invert said noise signal and obtain a primary antinoise signal; and a phase compensator configured to modify and adjust a phase of the primary antinoise signal in audio frequency range, in order to obtain an antinoise signal with the phase exactly opposite to that of said noise signal and apply an active filter implemented by a twin T network to compensate for phase loss at low frequency part caused by the non-closed earplug structure.

13. The communication earphone according to claim 8, wherein said communication earphone further comprises:

a howling detection unit configured to autonomously adjust the noise reduction at said receiving end by a control signal, if an energy of a certain frequency of a frequency spectrum of the sound signals picked up by microphones of said communication earphone is higher than that of other frequency bands by a preset value or more and the energy of the certain frequency is still increasing.

14. A communication earphone comprising:

at least two sending end microphones;

at least one receiving end microphone;

at least one speaker;

a sending end noise reduction unit connected with one or more of the at least two sending end microphones and one or more of the at least one receiving end microphone; wherein said sending end noise reduction unit comprises:

a wearing condition determining module configured to determine a wearing condition of said communication earphone by comparing an energy difference of sound signals picked up by the at least two sending end microphones, and wherein, if said energy difference is greater than a first preset threshold, the wearing condition determining module is configured to determine that said communication earphone is normally worn, and if the energy difference is smaller than or equal to the first preset threshold, the wearing condition determining module is configured to determine that said communication earphone is abnormally worn;

a multi-microphone noise reduction module configured to subject said sound signals to multi-microphone noise reduction processing when said communication earphone is normally worn; and a single channel noise reduction module configured to, if said communication earphone is normally worn, further suppress residuary stationary noise after said multi-microphone noise reduction module has subjected said sound signals to noise reduction processing, and configured to, if said communication earphone is abnormally worn, subject steady state noise in said sound signals to suppressing processing; and a receiving end noise reduction unit connected with one or more of the at least one receiving end microphone, the receiving end noise reduction unit connected with the at least one speaker, wherein the receiving end noise reduction unit comprises:

a noise signal picking up module configured to pick up a noise signal utilizing the microphones of said receiving end;

an antinoise signal determining module configured to obtain an antinoise signal according to said noise signal; and an output signal mixing module configured to superimpose said antinoise signal and a speech signal received by the receiving end and transmit said antinoise signal and said speech signal via the speaker of said receiving end.

15. The communication earphone according to claim 14, wherein, during operation of the communication earphone, said antinoise signal and said noise signal are canceled out with each other while said speech signal remains unchanged.

16. The communication earphone according to claim 14, further comprising:

an inverter connected with one or more of the at least one receiving end microphone, wherein the inverter is configured to invert said noise signal and obtain a primary antinoise signal; and a phase compensator connected with one or more of the at least one receiving end microphone, wherein the phase comparator is configured to modify and adjust a phase of the primary antinoise signal in an audio frequency range, in order to obtain said antinoise signal with a phase exactly opposite said noise signal and to apply an active filter implemented by a twin T network to compensate for phase loss at low frequency part caused by a non-closed earplug structure.

17. The communication earphone according to claim 14, further comprising:

a first amplifier connected with one or more of the at least one receiving end microphone, wherein the first amplifier is configured to amplify said noise signal picked up by the noise picking up module; and a second amplifier connected with one or more of the at least one receiving end microphone and the at least one speaker, the second amplifier is configured to amplify a mixed signal resulted from superimposing said antinoise signal and said speech signal.

18. The communication earphone according to claim 17, wherein said noise signal picked up by the receiving end microphone is amplified by the first amplifier, and then processed by an inverter and the phase compensator to generate the antinoise signal with identical amplitude and opposite phase with respect to said noise signal.

* * * * *